(12) United States Patent  
Bannon

(10) Patent No.: US 8,920,119 B2
(45) Date of Patent: Dec. 30, 2014

(54) PARTIAL COARSE PITCH START RAM AIR TURBINE WITH ENHANCED SPRING SUPPORT

(75) Inventor: David G. Bannon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1095 days.

(21) Appl. No.: 12/917,198

(22) Filed: Nov. 1, 2010

(65) Prior Publication Data

US 2012/0107119 A1    May 3, 2012

(51) Int. Cl.
F03D 9/00 (2006.01)
F02C 7/32 (2006.01)

(52) U.S. Cl.
CPC . *F02C 7/32* (2013.01); *Y02E 10/72* (2013.01); *F03D 9/00* (2013.01); *F05D 2220/34* (2013.01); *F05D 2260/79* (2013.01)
USPC .............................................. 416/52; 416/140

(58) Field of Classification Search
CPC .............. B64D 41/007; F05D 2220/34; F05D 2260/77; F05B 2220/31; F03D 7/001
USPC ......... 416/44, 46, 51, 52, 135–137, 139, 140, 416/147
See application file for complete search history.

(56) References Cited

U.S. PATENT DOCUMENTS

| 3,635,583 A | 1/1972 | Chilman et al. |
| 3,635,584 A | 1/1972 | Chilman et al. |
| 4,411,596 A | 10/1983 | Chilman et al. |
| 4,578,019 A | 3/1986 | Safarik |
| 4,671,737 A | 6/1987 | Whitehouse |
| 4,692,093 A | 9/1987 | Safarik |
| 4,701,104 A | 10/1987 | Cohen |
| 4,743,163 A | 5/1988 | Markunas et al. |

(Continued)

FOREIGN PATENT DOCUMENTS

| EP | 0522874 B1 | 1/1993 |
| EP | 0629165 B1 | 12/1994 |

(Continued)

OTHER PUBLICATIONS

International Search Report; International Application No. GB1120637.2; International Filing Date Mar. 29, 2012; Date of Mailing Apr. 3, 2012; 4 pages.

(Continued)

*Primary Examiner* — Edward Look
*Assistant Examiner* — Jesse Prager
(74) *Attorney, Agent, or Firm* — Cantor Colburn LLP

(57) ABSTRACT

A Ram Air Turbine (RAT) is provided and includes a turbine hub having an end plate and a nose cone attached thereto at trailing and leading ends, respectively, a governor shaft, to which turbine blades are connected, which is coupled to the end plate and supported within the nose cone to be rotatable with the turbine blades about a central axis thereof and axially movable from a first position relative to the turbine hub to a second position relative to the turbine hub and a hub assembly operably coupled to the turbine hub, the governor shaft and the turbine blades whereby the hub assembly biases the governor shaft toward the first position at low rotational speeds such that the turbine blades assume a partial coarse pitch angle, and the second position at high rotational speeds such that the turbine blades assume a fine pitch angle.

15 Claims, 3 Drawing Sheets

(56) References Cited

U.S. PATENT DOCUMENTS

| | | |
|---|---|---|
| 5,174,719 A | 12/1992 | Walsh |
| 5,257,907 A | 11/1993 | Seidel |
| 5,487,645 A | 1/1996 | Eccles |
| 5,562,417 A | 10/1996 | Grimm et al. |
| 5,685,694 A | 11/1997 | Jones et al. |
| 5,779,446 A | 7/1998 | Althof et al. |
| 7,074,010 B2 | 7/2006 | DeGroff et al. |
| 7,296,970 B2 | 11/2007 | Bannon et al. |
| 7,306,430 B2 | 12/2007 | Russ |
| 7,419,357 B2 | 9/2008 | Nohr et al. |
| 2006/0078430 A1 | 4/2006 | DeGroff et al. |
| 2006/0239817 A1 | 10/2006 | Nohr et al. |
| 2006/0244140 A1 | 11/2006 | Hu |
| 2006/0263220 A1 | 11/2006 | Russ |
| 2006/0280603 A1 | 12/2006 | Bannon et al. |
| 2012/0093653 A1* | 4/2012 | Russ .................. 416/151 |

FOREIGN PATENT DOCUMENTS

| | | |
|---|---|---|
| EP | 0713008 A1 | 5/1996 |
| EP | 0713008 B1 | 5/1996 |
| EP | 2399829 A2 | 12/2011 |
| GB | 2072271 A | 9/1981 |

OTHER PUBLICATIONS

International Search Report; International Application No. GB1120723.0; International Filing Date Mar. 30, 2012; Date of Mailing; 4 pages.

* cited by examiner

PARTIAL COARSE PITCH START RAM AIR TURBINE WITH ENHANCED SPRING SUPPORT

BACKGROUND OF THE INVENTION

The subject matter disclosed herein relates to a Ram Air Turbine (RAT) and, more particularly, a partial coarse pitch start RAT with enhanced spring support.

Aircraft often include as standard equipment backup power supplied for use in times of power outage in the form of air driven turbines, which are lowered into the airstream, thereby making use of the relative speed of the aircraft through the ambient air to cause the turbine blades to rotate. The rotation imparted to the blades due to their movement through the air is then used to drive electrical generating gear or to provide hydraulic power to the aircraft hydraulic system during the aforementioned times of power outages. These air driven turbine arrangements typically include Ram Air Turbine governor mechanisms that attempt to control the output rotational speed delivered from the turbines to electrical or hydraulic units that are designed to operate most efficiently at a set or given speed.

In some cases, systems employing a Ram Air Turbine governor mechanism start at coarse pitch (approx 50 to 60 degrees) blade angles to enhance start torque and then shift back to fine pitch (approximately 9 degrees) by virtue of flyweights to maximize full speed performance. These systems may present operational issues, however, in that they include cantilevered springs that may create vibration and sticky operation. Also, starting at full coarse pitch start angles may result in the governor mechanisms staying in coarse pitch at low airspeeds because the maximum speed attainable at coarse pitch may be below the speed where the flyweights have sufficient force to shift the governor back to fine pitch.

BRIEF DESCRIPTION OF THE INVENTION

According to one aspect of the invention, a Ram Air Turbine (RAT) is provided and includes a turbine hub having an end plate and a nose cone attached thereto at trailing and leading ends, respectively, a governor shaft, to which turbine blades are connected, which is coupled to the end plate and supported within the nose cone to be rotatable with the turbine blades about a central axis thereof and axially movable from a first position relative to the turbine hub to a second position relative to the turbine hub and a hub assembly operably coupled to the turbine hub, the governor shaft and the turbine blades whereby the hub assembly biases the governor shaft toward the first position at low rotational speeds such that the turbine blades assume a partial coarse pitch angle, and the second position at high rotational speeds such that the turbine blades assume a fine pitch angle.

According to another aspect of the invention, a Ram Air Turbine (RAT) is provided and includes a turbine hub having an end plate and a nose cone attached thereto at trailing and leading ends, respectively, the nose cone being formed to define a recess therein, a governor shaft, to which turbine blades are connected, which is coupled to the end plate and supported within the nose cone recess to be rotatable with the turbine blades about a central axis thereof and axially movable from a first position relative to the turbine hub to a second position relative to the turbine hub and a hub assembly operably coupled to the turbine hub, the governor shaft and the turbine blades whereby the hub assembly biases the governor shaft toward, the first position at low rotational speeds such that the turbine blades assume a partial coarse pitch angle, and the second position at high rotational speeds such that the turbine blades assume a fine pitch angle.

According to yet another aspect of the invention, a Ram Air Turbine (RAT) is provided and includes a turbine hub having an end plate and a nose cone attached thereto at trailing and leading ends, respectively, a governor shaft with a yoke plate attached thereto, to which turbine blades are connected such that the turbine blades extend in and are rotatable about a radial dimension, the governor shaft being coupled to the end plate and supported within the nose cone to be rotatable with the turbine blades about a central axis thereof and axially movable from a first position relative to the turbine hub to a second position, a seat member biased toward the yoke plate to constrain a cam follower between the yoke plate and the seat member and a hub assembly operably coupled to the turbine hub and the governor shaft whereby the hub assembly biases the governor shaft toward the first position at low rotational speeds such that the cam follower is positioned at a first cam follower position and the turbine blades assume a partial coarse pitch angle, and the second position at high rotational speeds such that the cam follower is positioned at a second cam follower position and the turbine blades assume a fine pitch angle.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
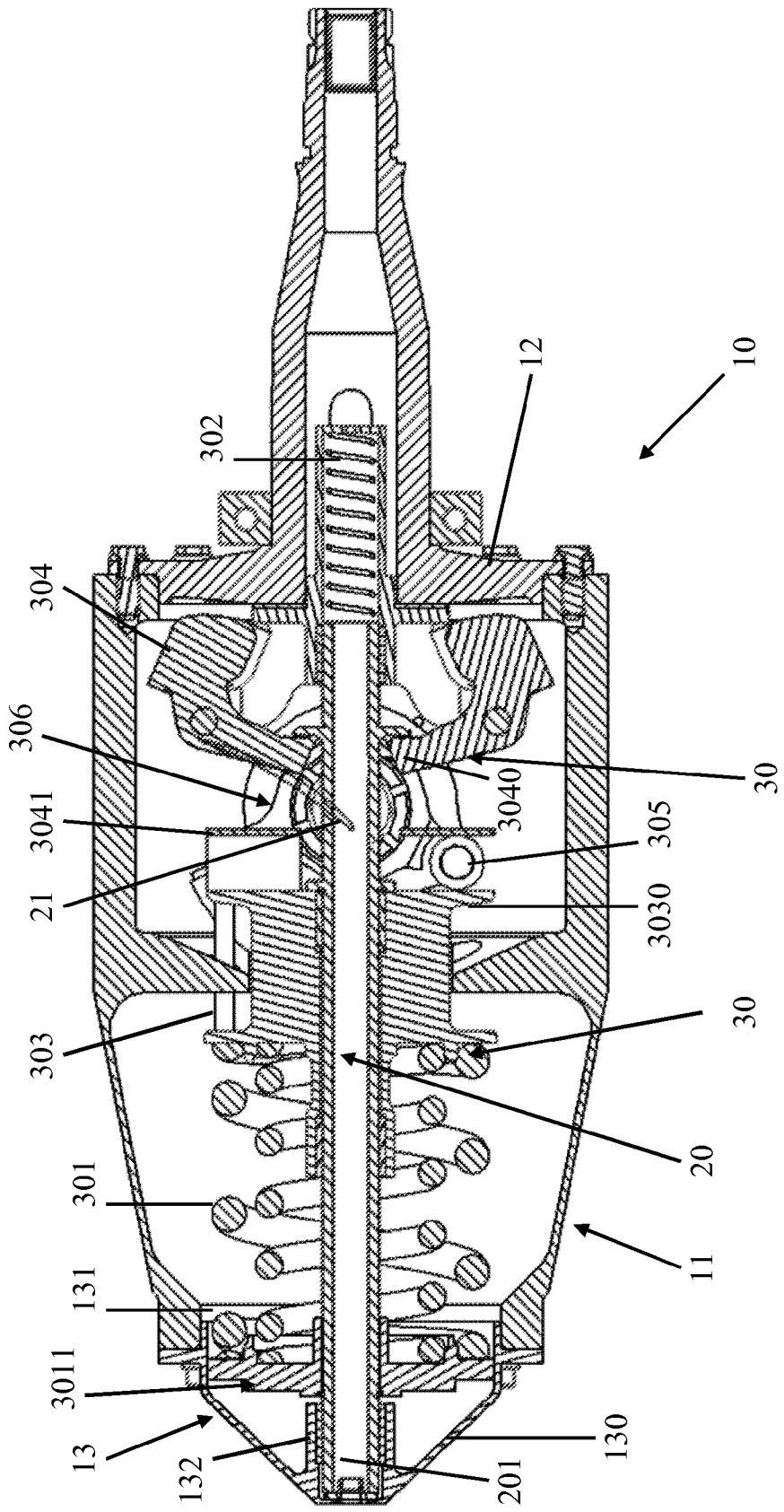
FIG. 1 is a side sectional view of a turbine in a first position.
Figure 2:
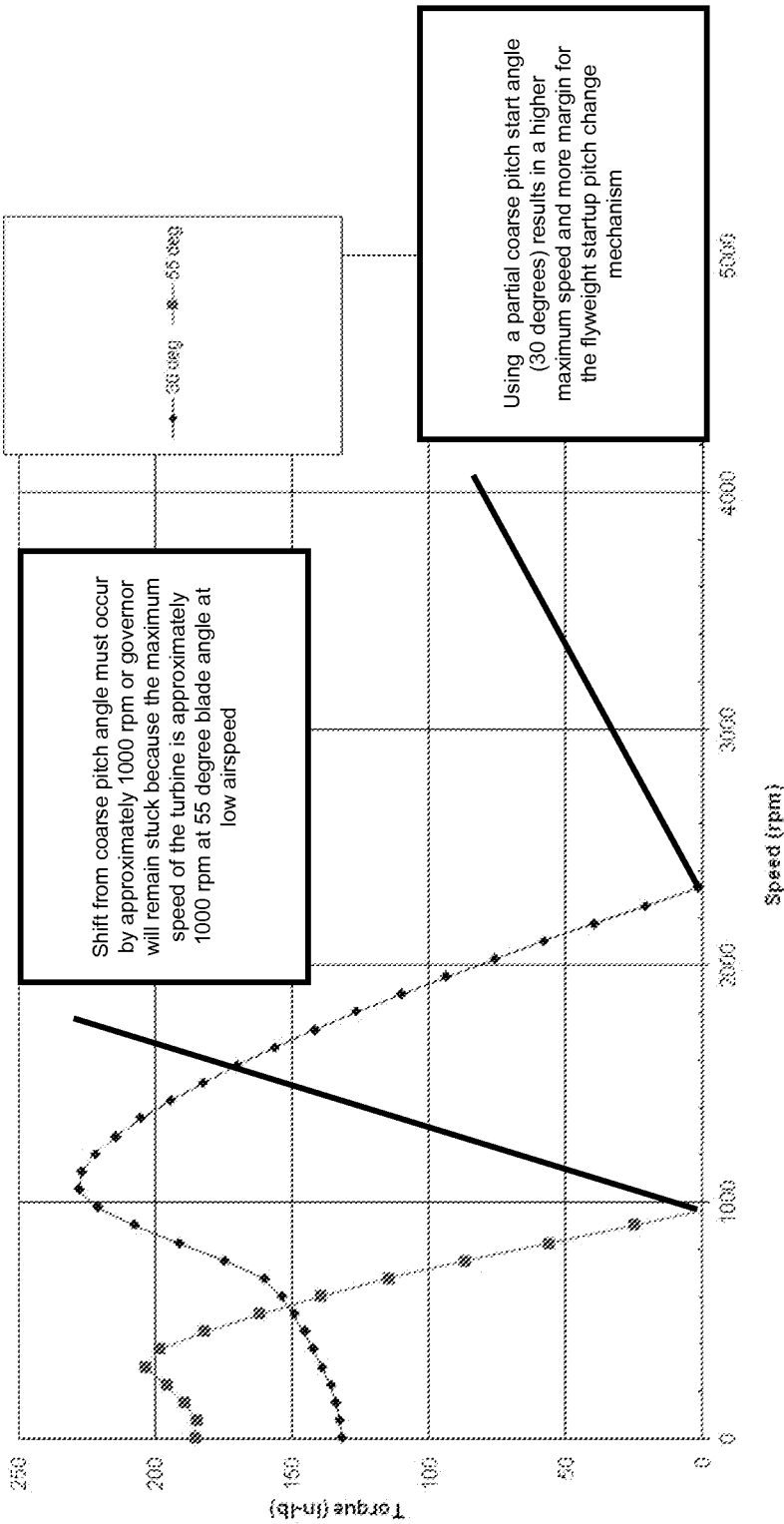
FIG. 2 is a graphical illustration of torque versus rotational speed for the turbine of FIG. 1.
Figure 3:
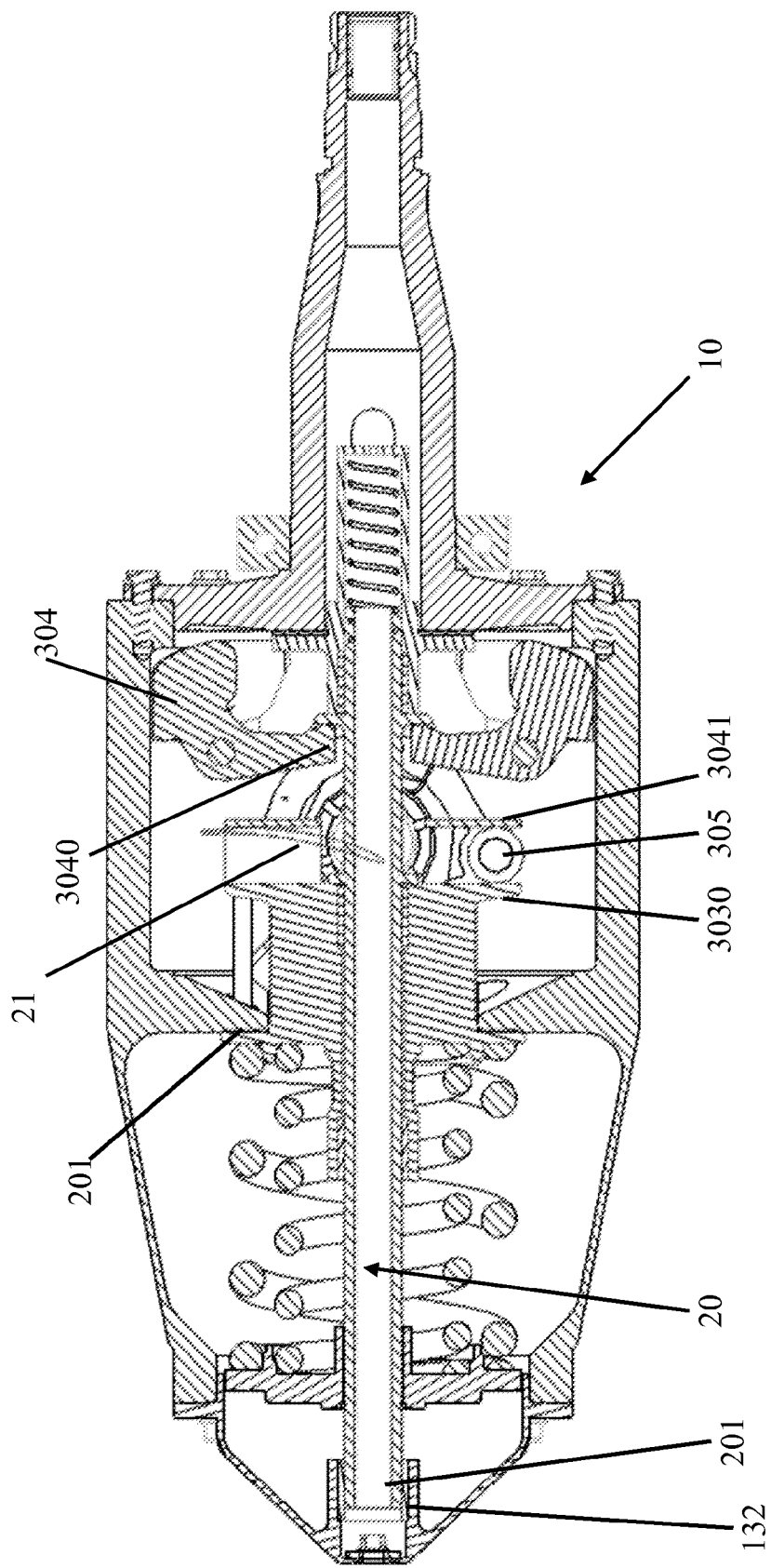
FIG. 3 is a side sectional view of the turbine of FIG. 1 in a second position.

With reference to FIGS. 1-3, a Ram Air Turbine (RAT) 10 is provided. The RAT 10 includes a turbine hub 11 having an end plate 12 and a nose cone 13 attached thereto at trailing and leading ends, respectively, which oppose one another and are defined in accordance with a flow direction of air along an airstream. The RAT 10 further includes a governor shaft 20, to which turbine blades 21 are connected, and a hub assembly 30. The turbine blades 21 extend radially outwardly from the governor shaft 20 and are rotatable about the radial dimension thereof to assume various pitch blade angles as will be described below. The governor shaft 20 is coupled to the end plate 12 and supported within the nose cone 13 and is configured to be rotatable with the turbine blades 21 about a central axis thereof. The governor shaft 20 is also axially movable from a first position (see FIG. 1) relative to the turbine hub 11 to a second position (see FIG. 3) relative to the turbine hub 11.

Where the RAT 10 is installed on an aircraft, the RAT 10 may be employed to provide electrical and/or hydraulic power to the aircraft in an event of a high power load condition, a low power condition or a power outage. In operation, the RAT 10 may be deployed in an airstream formed due to the relative movement of the aircraft with the turbine blades 21 turned as air flows along their respective surfaces. The turning of the turbine blades 21 causes the turbine hub 11 and end plate 12 to correspondingly rotate about the central axis thereof and this rotation can be employed to generate electrical current in electricity generating components.

At low airspeeds and at the moment of deployment, the rotation of the turbine blades 21 and the turbine hub 11 is relatively slow with 0 value rotational speed to intermediate rotational speeds, such as about 500 to just less than 1000 revolutions per minute (RPMs), and low torque generated whereas the rotation speed will increase after a given time from the intermediate rotational speeds to high rotational speeds, such as up to 4000-5000 RPMs or more, and with high levels of torque generated. In accordance with aspects, in order to increase the level of torque generated at the low to intermediate rotational speeds, the turbine blades 21 will assume a partial coarse pitch blade angle of about 30 degrees. Then, as rotational speeds increase, in order to maintain efficient operational capability, the turbine blades 21 assume a fine pitch blade angle of about 9 degrees.

The hub assembly 30 is operably coupled to the turbine hub 11, the governor shaft 20 and the turbine blades 21 whereby the hub assembly 30 biases the governor shaft 20 toward the first position at the low rotational speeds such that the turbine blades 21 assume the partial coarse pitch angle of about 30 degrees at RAT 10 deployment and during the initial speed up period. The hub assembly 30 further biases the governor shaft 20 toward the second position at high rotational speeds such that the turbine blades 21 assume the fine pitch angle of about 9 degrees during later stages of RAT 10 operation. In this way, at the low rotational speeds as shown in FIG. 2, the RAT 10 having the turbine blades 21 at the partial coarse pitch angle will generate less torque than a typical RAT having turbine blades at the full coarse pitch angle. However, as is further shown in the non-limiting example of FIG. 2, the decreased torque should still be sufficient for start up and, as rotational speeds increase, the maximum torque produced by the RAT 10 will be higher than normal and the margins for the speed at which the fine pitch blade angle needs to be assumed are increased.

As shown in FIG. 1, the nose cone 13 includes a body 130 having an aft facing surface 131 that faces away from the leading end and toward the hub assembly 30. The body 130 and the aft facing surface 131 cooperatively define a forwardly extending recess 132 from the aft facing surface 131 at the central axis. The governor shaft 20 is supported in the recess 132. In particular, a leading end 201 of the governor shaft 20 is supported within the recess 132 with the leading end 201 occupying a shallow section of the recess 132 when the governor shaft 20 is moved to the second position and a distal end of the recess 132 when the governor shaft 20 is moved to the first position. Thus, the leading end 201 of the governor shaft 20 may always be supported within the recess 132.

The hub assembly 30 includes a plurality of governor springs 301, a shaft spring 302, yoke plate guide pins 303, a flyweight 304 and a cam follower 305. The shaft spring 302 is anchored to the end plate 12 and serves to apply bias to the governor shaft 20 towards the first position.

The flyweight 304 may be plural in number and rotatable about a pivot pin to affect a pitch angle of the turbine blades 21 at predefined rotational speeds between the low and high rotational speeds. In a similar manner, the cam follower 305 may also be plural in number with each cam follower 305 being movable to change a pitch angle of the associated turbine blade 21 at the predefined rotational speeds between the low and high rotational speeds.

In operation, at deployment and at the low rotational speeds as shown in FIG. 1, the governor shaft 20 occupies the first position with the leading edge 201 supported within the recess 132 to the distal end thereof. The yoke plate guide pins 303, the yoke plate 3030, the governor springs 301 and a forward spring seat 3011 are axially positioned in accordance with the governor shaft 20 positioning. At the same time, since rotational speeds are low, the flyweight 304 remains in the radially inward rotational position whereby an actuator arm 3040 thereof positions a seat member 3041 opposite the yoke plate 3030. The seat member 3041 is otherwise biased toward the nose cone 13 by the shaft spring 302. The cam follower 305 is thereby constrained in a first cam follower position between the yoke plate 3030 and the seat member 3041. This first cam follower position corresponds to the partial coarse pitch blade angle of the turbine blades 21.

As the rotational speeds increase, the cam follower 305 is continually constrained in the first cam follower position due to the forces applied by the shaft spring 302, the flyweights 304 and a blade/counterweight assembly 306 remaining in balance. However, as rotational speeds increase beyond the intermediate rotational speeds and those forces unbalance, the cam follower 305 is moved from the first cam follower position to a second cam follower position.

At the high rotational speeds as shown in FIG. 3, the governor shaft 20 occupies the second position with the leading edge 201 supported within the shallow section of the recess 132. The yoke plate guide pins 303, including the yoke plate 3030, are axially positioned in accordance with the governor shaft 20 positioning. At the same time, since rotational speeds are now high, the flyweight 304 assumes the radially outward rotational position whereby the actuator arm 3040 compresses the shaft spring 302 such that the seat member 3041 recedes from the nose cone 13. As the cam follower 305 remains constrained between the yoke plate 3030 and the seat member 3041, the cam follower 305 is thereby positioned in the second cam follower position characterized in that the cam follower 305 is axially moved in the aft direction and radially moved outwardly from the first cam follower position. This second cam follower position corresponds to the fine pitch blade angle of the turbine blades 21.

At the high rotational speeds and with the flyweight 304 rotated radially outwardly, normal governing can be permitted whereby an increase in the flow speed of the airstream will tend to increase the pitch of the turbine blades 21 and vice versa. The governor springs 301 and the blade/counterweight assembly 306 will seek a position that will produce fairly constant turbine speed. The flyweights 304 remain in their radially outward position at all times when the RAT 10 is operating at full speed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A Ram Air Turbine (RAT), comprising:
a turbine hub having an end plate and a nose cone attached thereto at trailing and leading ends, respectively;
a governor shaft, to which turbine blades are connected, which is coupled to the end plate and supported within the nose cone to be rotatable with the turbine blades about a central axis thereof and axially movable from a first position relative to the turbine hub to a second position relative to the turbine hub; and
a hub assembly operably coupled to the turbine hub, the governor shaft and the turbine blades whereby the hub assembly biases the governor shaft toward:
the first position at low rotational speeds such that the turbine blades assume a partial coarse pitch angle of about 30 degrees, and
the second position at high rotational speeds such that the turbine blades assume a fine pitch angle,
wherein the nose cone comprises a body having an aft facing surface, the body and the aft facing surface defining a forwardly extending recess from the aft facing surface at the central axis in which the governor shaft is supported, and
wherein the hub assembly further comprises a shaft spring anchored to the end plate to apply bias to the governor shaft and a plurality of governor springs anchored to a forward spring seat disposed aft of a leading edge of the governor shaft.

2. The RAT according to claim 1, wherein a leading end of the governor shaft is supported within the recess.

3. The RAT according to claim 2, wherein the leading end occupies a shallow section of the recess when the governor shaft is moved to the second position and a distal end of the recess when the governor shaft is moved to the first position.

4. The RAT according to claim 1, wherein the turbine blades assume about a 9 degree fine pitch angle.

5. The RAT according to claim 1, wherein the low rotational speeds include 0 to intermediate rotational speeds and the high rotational speeds include the intermediate to high rotational speeds.

6. A Ram Air Turbine (RAT), comprising:
a turbine hub having an end plate and a nose cone attached thereto at trailing and leading ends, respectively;
a governor shaft, to which turbine blades are connected, which is coupled to the end plate and supported within the nose cone to be rotatable with the turbine blades about a central axis thereof and axially movable from a first position relative to the turbine hub to a second position relative to the turbine hub; and
a hub assembly operably coupled to the turbine hub, the governor shaft and the turbine blades whereby the hub assembly biases the governor shaft toward:
the first position at low rotational speeds such that the turbine blades assume a partial coarse pitch angle of about 30 degrees, and
the second position at high rotational speeds such that the turbine blades assume a fine pitch angle, wherein the hub assembly comprises guide pins coupled to the yoke plate to axially move with the governor shaft.

7. The RAT according to claim 1, wherein the hub assembly comprises a flyweight, which is rotatable about a pivot pin to affect a pitch angle of the turbine blades at predefined rotational speeds between the low and high rotational speeds.

8. The RAT according to claim 1, wherein the hub assembly comprises a cam follower, which is movable to change a pitch angle of the turbine blades at predefined rotational speeds between the low and high rotational speeds.

9. A Ram Air Turbine (RAT), comprising:
a turbine hub having an end plate and a nose cone attached thereto at trailing and leading ends, respectively, the nose cone being formed to define a recess therein;
a governor shaft, to which turbine blades are connected, which is coupled to the end plate and supported within the nose cone recess to be rotatable with the turbine blades about a central axis thereof and axially movable from a first position relative to the turbine hub to a second position relative to the turbine hub; and
a hub assembly operably coupled to the turbine hub, the governor shaft and the turbine blades whereby the hub assembly biases the governor shaft toward:
the first position at low rotational speeds such that the turbine blades assume a partial coarse pitch angle of about 30 degrees, and
the second position at high rotational speeds such that the turbine blades assume a fine pitch angle,
wherein the nose cone comprises a body having an aft facing surface, the body and the aft facing surface defining the recess as a forwardly extending recess from the aft facing surface at the central axis, and
wherein the hub assembly comprises a shaft spring anchored to the end plate to apply bias to the governor shaft and a plurality of governor springs anchored to a forward spring seat disposed aft of a leading edge of the governor shaft.

10. The RAT according to claim 9, wherein the turbine blades assume about a 9 degree fine pitch angle.

11. The RAT according to claim 9, wherein the low rotational speeds include 0 to intermediate rotational speeds and the high rotational speeds include the intermediate to high rotational speeds.

12. A Ram Air Turbine (RAT), comprising:
a turbine hub having an end plate and a nose cone attached thereto at trailing and leading ends, respectively;
a governor shaft, to which turbine blades are connected, which is coupled to the end plate and supported within the nose cone to be rotatable with the turbine blades about a central axis thereof and axially movable from a first position relative to the turbine hub to a second position relative to the turbine hub; and
a hub assembly operably coupled to the turbine hub, the governor shaft and the turbine blades whereby the hub assembly biases the governor shaft toward:
the first position at low rotational speeds such that the turbine blades assume a partial coarse pitch angle of about 30 degrees, and
the second position at high rotational speeds such that the turbine blades assume a fine pitch angle, wherein the hub assembly comprises guide pins coupled to the yoke plate to axially move with the governor shaft.

13. The RAT according to claim 9, wherein the hub assembly comprises a flyweight, which is rotatable about a pivot pin to affect a pitch angle of the turbine blades at predefined rotational speeds between the low and high rotational speeds.

14. The RAT according to claim 9, wherein the hub assembly comprises a cam follower, which is movable to change a pitch angle of the turbine blades at predefined rotational speeds between the low and high rotational speeds.

15. A Ram Air Turbine (RAT), comprising:
a turbine hub having an end plate and a nose cone attached thereto at trailing and leading ends, respectively;
a governor shaft with a yoke plate attached thereto, to which turbine blades are connected such that the turbine blades extend in and are rotatable about a radial dimension, the governor shaft being coupled to the end plate and supported within the nose cone to be rotatable with the turbine blades about a central axis thereof and axially movable from a first position relative to the turbine hub to a second position;

a seat member biased toward the yoke plate to constrain a cam follower between the yoke plate and the seat member; and a hub assembly comprising a shaft spring and governor springs anchored to aft and forward portions of the turbine hub, respectively, and to the governor shaft whereby the hub assembly biases the governor shaft toward:

the first position at low rotational speeds such that the cam follower is positioned at a first cam follower position and the turbine blades assume a partial coarse pitch angle of about 30 degrees, and the second position at high rotational speeds such that the cam follower is positioned at a second cam follower position and the turbine blades assume a fine pitch angle, wherein a leading edge of the governor shaft is positioned forward of an anchoring of the governor springs to the forward portion of the turbine hub.

* * * * *